(12) United States Patent
Grover et al.

(10) Patent No.: US 8,375,114 B2
(45) Date of Patent: Feb. 12, 2013

(54) DEVICE LOADING IN STORAGE NETWORKS

(75) Inventors: Rajiv K. Grover, Folsom, CA (US); Banu Amalkanti, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2756 days.

(21) Appl. No.: 10/821,832

(22) Filed: Apr. 9, 2004

(65) Prior Publication Data

US 2005/0229182 A1    Oct. 13, 2005

(51) Int. Cl.
G06F 15/173 (2006.01)

(52) U.S. Cl. .......................... 709/223; 711/100

(58) Field of Classification Search ................ 718/105, 718/104; 710/1; 713/201; 711/114, 162–167, 711/100; 709/223–227; 370/351, 412
See application file for complete search history.

(56) References Cited

U.S. PATENT DOCUMENTS

| | | | |
|---|---|---|---|
| 5,426,736 A | 6/1995 | Guineau, III | |
| 5,644,789 A * | 7/1997 | Matthews et al. | 710/36 |
| 6,421,723 B1 | 7/2002 | Tawil | |
| 6,631,455 B1 | 10/2003 | Raza et al. | |
| 6,886,054 B2 * | 4/2005 | Taninaka et al. | 710/52 |
| 6,948,015 B2 * | 9/2005 | Ogasawara et al. | 710/74 |
| 7,162,550 B2 * | 1/2007 | Douglas | 710/35 |
| 7,203,730 B1 * | 4/2007 | Meyer et al. | 709/213 |
| 7,225,242 B2 * | 5/2007 | Cherian et al. | 709/223 |
| 2002/0103923 A1 | 8/2002 | Cherian et al. | |
| 2003/0037187 A1 * | 2/2003 | Hinton et al. | 710/1 |
| 2003/0154353 A1 | 8/2003 | Merrill et al. | |
| 2003/0227651 A1 | 12/2003 | Mathieson | |
| 2003/0236952 A1 | 12/2003 | Grieff et al. | |
| 2003/0236953 A1 | 12/2003 | Grieff et al. | |
| 2004/0044846 A1 | 3/2004 | Matthews et al. | |
| 2004/0078599 A1 * | 4/2004 | Nahum | 713/201 |

OTHER PUBLICATIONS

Tate et al, IBM San Survival Guide, IBM Redbooks, Oct. 2003, pp. 1-662.*
McCullough, Walter; "Preliminary (OFF) White Paper on High Availability Disk Products for the HP3000" Hewlett-Packard White Paper published on the internet at May 20, 1997, 6 pages.
McCullough, Walter; "Another (OFF) White Paper on High Availability Storage Option and Their Impact on Performance on the HP e3000" Hewlett-Packard White Paper Jan. 2004, 9 pages.

* cited by examiner

*Primary Examiner* — Diem Cao

(57) ABSTRACT

Systems and methods for implementing device loading in storage networks are disclosed. In an exemplary implementation a computer program product encodes a computer program for executing on a computer system a computer process. The computer process comprises identifying a plurality of storage devices to be configured in a storage network, identifying a number of host port LUNs configured on each of the storage devices, and identifying a number of host port connections to the storage devices. For each host port connection, the computer process determines actual loading for each of the storage devices based at least in part on the queue depth for each of the host port LUNs.

23 Claims, 7 Drawing Sheets

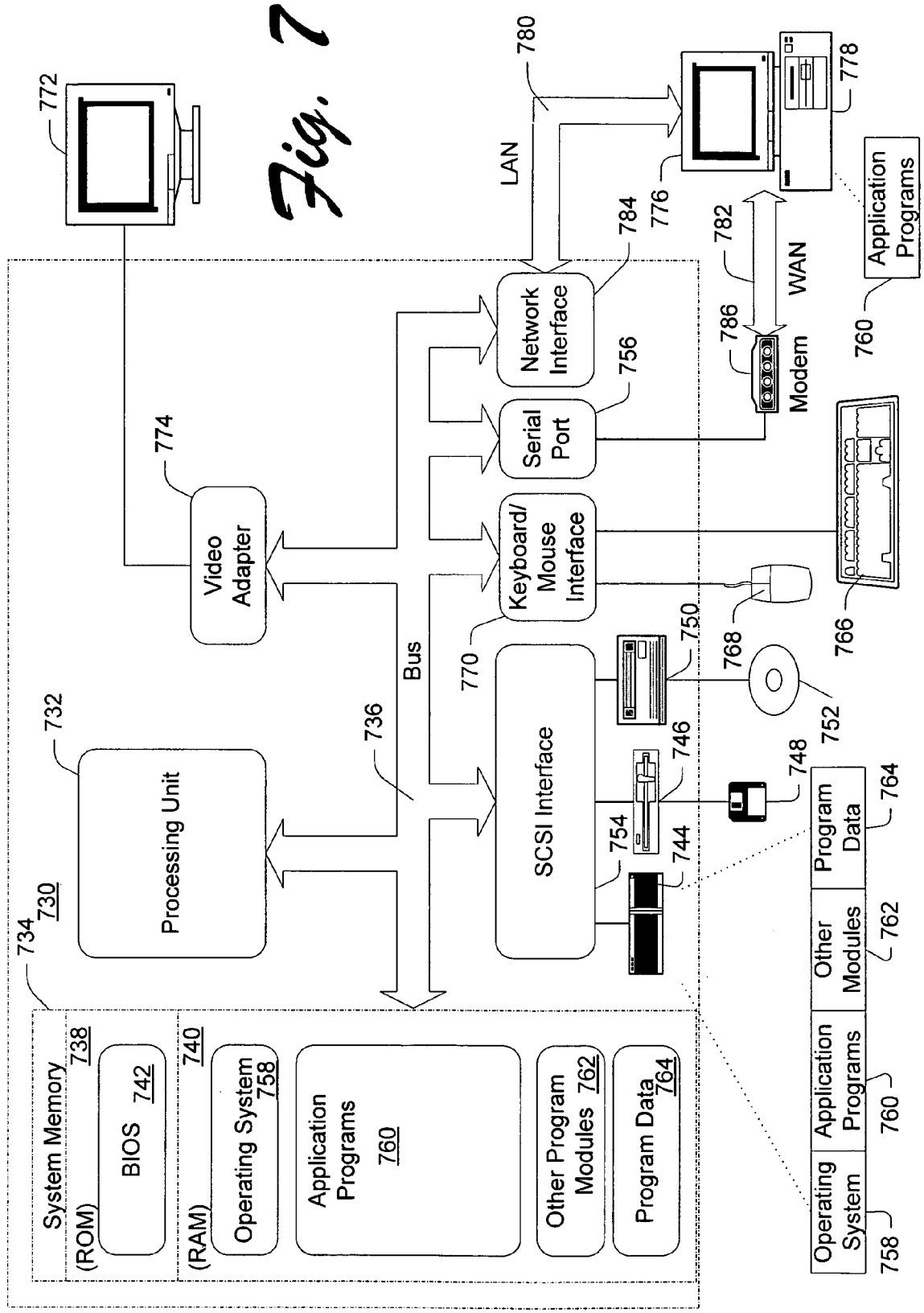

DEVICE LOADING IN STORAGE NETWORKS

TECHNICAL FIELD

The described subject matter relates to storage networks, and more particularly to systems and methods for implementing device loading in storage networks.

BACKGROUND

Storage networks are commercially available for storing large volumes of data on various types of storage devices, such as, e.g., RAID (Redundant Array of Independent Disks) and SAN (storage area network) disk arrays. By their nature, storage networks may be accessed simultaneously by many different users to process multiple Input/Output (IO) jobs. IO jobs are typically held in a queue at the storage device and processed, e.g., in the order received. When the queue is full, the storage device may issue a message (e.g., BUSY or QFULL) requesting that the host wait before retrying an IO job so that the storage device is able to process IO jobs already in the queue.

Heterogeneous storage networks are commonly designed to operate with a wide variety of different host platforms, operating systems, host bus adapters (HBAs), and storage devices from different vendors. Each host platform may be designed to respond differently to messages issued by the storage device. For example, while some hosts may respond to a BUSY message by waiting before retrying an IO job, another host may respond to a BUSY message by immediately retrying an IO job and causing the storage network to crash.

Although storage device vendors may work with vendors for each of the different host platforms and attempt to reach agreement upon standards, this can be a time-consuming and expensive process and may have implementation issues, and still does not resolve legacy support issues. In addition, each vendor often has other issues to address with their platform and may be unwilling to invest time and money into resolving network storage issues. Therefore, the burden falls on the network architect to design storage networks that function with a wide variety of different host platforms.

SUMMARY

Device loading in storage networks may be implemented in a computer program product encoding a computer program for executing on a computer system a computer process. The computer process may comprise: identifying a plurality of storage devices to be configured in a storage network, identifying a number of host port Logical Unit Numbers or "Logical Units" for short (collective referred to herein as "LUN" or "LUNs") configured on each of the storage devices, identifying a number of host port connections to the storage devices, and for each host port connection, determining actual loading for each of the storage devices based at least in part on the queue depth for each of the host port LUNs.

In another exemplary implementation, the computer process may comprise: identifying a plurality of storage devices to be configured in a storage network, identifying a number of host port connections to the storage devices, and for each host port connection, determining actual loading for each of the storage devices based at least in part on the queue depth for each of the host port connections.

Device loading in storage networks may be implemented as a method, comprising: configuring a storage device in the storage network with a plurality of host port LUNs, identifying a queue depth for each of the host port LUNs, automatically determining actual loading for the storage device based at least in part on the queue depth for each host port LUN, and accepting the storage device configuration if the actual loading for the storage device is no more than a maximum loading for the storage device.

In another exemplary implementation, the method may comprise: configuring the storage network with a plurality of host port connections to at least one storage device, and for each of a plurality of host port connections to the at least one storage device, determining actual loading of the at least one storage device based at least in part on the queue depth of each host port connection.

BRIEF DESCRIPTION OF THE DRAWINGS

FIG. 7 is a schematic illustration of an exemplary computing device that may be utilized to implement operations for device loading in storage networks.

DETAILED DESCRIPTION

Briefly, device loading in storage networks may be implemented by identifying a number of parameters for hosts and storage devices (e.g., target) to provide an IO flow control mechanism. Exemplary parameters may include the number of host paths (P) to a storage device, queue depth (q) per logical unit or LUN, number of LUNs (L) configured for the host, queue depth (Service-Q) for the storage device, and queue depth (Q) for the host port. Operations are also disclosed and claimed herein which implement device loading for host groups and LUN security groups. In addition, the operations may be used by network architects and in the laboratory/test environment for optimum configuration providing maximum test coverage.

It is noted that the operations described herein may be embodied as logic instructions on a computer-readable medium. When executed on a processor, the logic instructions cause a general purpose computing device to be programmed as a special-purpose machine that implements the described operations.

Exemplary Network Architecture

Figure 1:
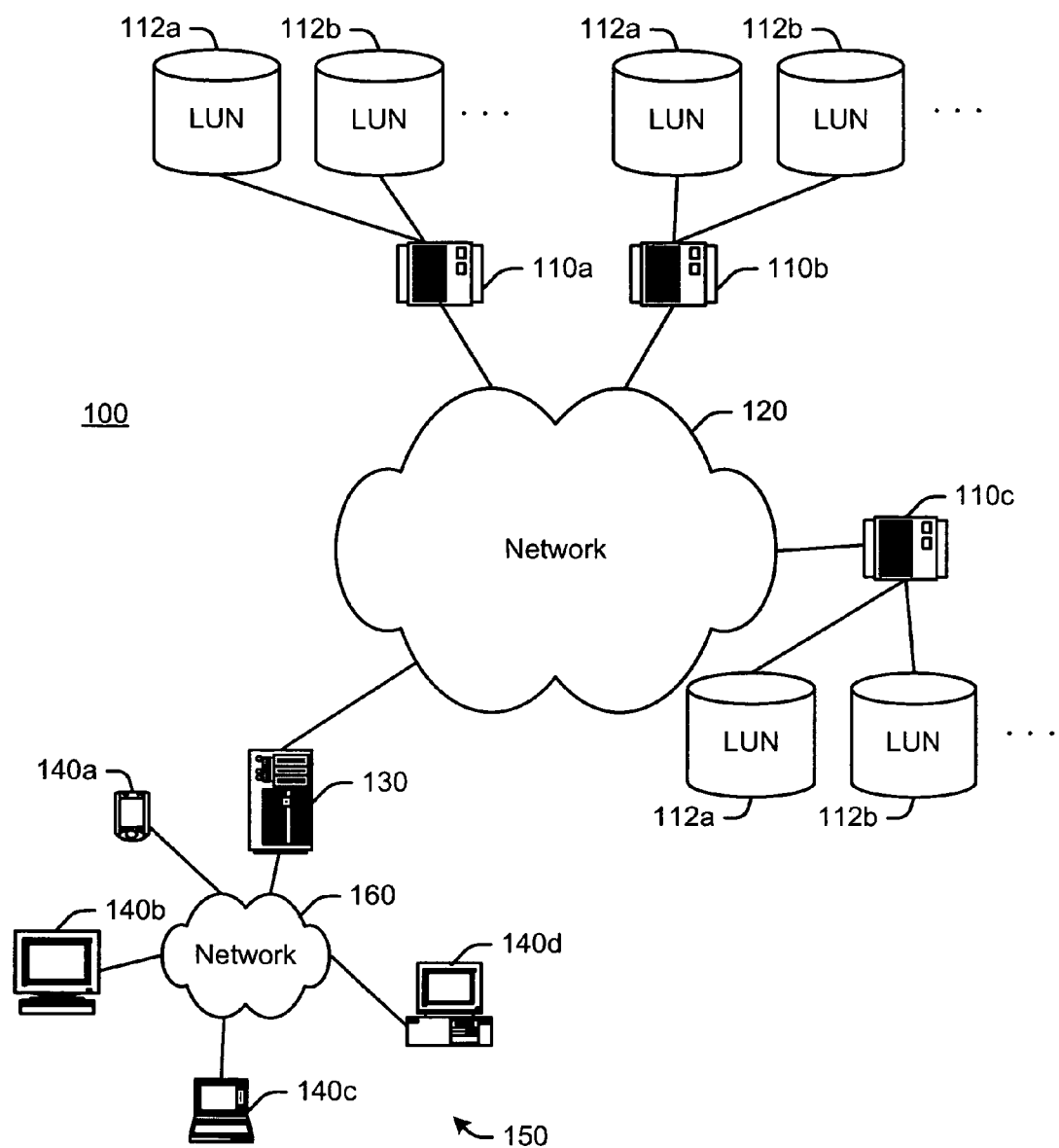
FIG. 1 is a schematic illustration of an exemplary implementation of a networked computing system that utilizes a storage network.

FIG. 1 is a schematic illustration of an exemplary implementation of a networked computing system that utilizes a storage network. A storage network 100 may include storage devices 110*a-c* (generally referred to herein as "storage devices 110") communicatively coupled in a suitable communications network 120. Communications network 120 may be implemented as a private, dedicated network such as, e.g., a Fibre Channel (FC) switching fabric. Alternatively, portions of communication network 120 may be implemented using public communication networks pursuant to a suitable communication protocol such as, e.g., the Internet Small Computer Serial Interface (iSCSI) protocol.

Storage devices 110 provide an arbitrarily large quantity of storage space in the storage network 100. In practice, storage space is finite and based upon the particular hardware used to implement the storage network 100. By way of example, a switching fabric comprising a single FC switch can interconnect 256 or more storage device ports. However, there are few theoretical limits to the storage space available in a storage network.

Storage network 100 may include a plurality of logical disks (also called logical units or LUNs) 112a, 112b allocated within each of the storage devices 110. Each LUN 112a, 112 (generally referred to as LUNs 112) comprises a contiguous range of logical addresses that can be addressed by one or more hosts 130 by mapping requests from the host 130 to the uniquely identified LUN 112.

As used herein, the term "host" includes computing system(s) that utilize storage on its own behalf, or on behalf of clients (e.g., computing devices 140a-d) coupled to the host. For example, host 130 may be implemented as a file server that provides storage services for an enterprise 150 including clients 140a-d. Clients 140a-d may connect to the host 130 directly or via a network 160 such as, e.g., a Local Area Network (LAN) or a Wide Area Network (WAN). In such an implementation, host 130 connects to the storage network 100 via a communication connection such as, e.g., a Fibre Channel (FC) connection, and may include one or more disk controllers configured to manage multiple storage devices in the storage network 100.

When clients 140a-d and/or host 130 require storage capacity from the storage network, logic instructions on the host 130 establish a connection between a host port and one or more LUNs available on one or more of the storage devices 110 in the storage network 100. It will be appreciated that, because a LUN is a logical unit, not necessarily a physical unit, the physical storage space that constitutes the LUN may be distributed across multiple storage devices 110.

Before continuing, it is noted that each of the devices shown in FIG. 1 may include memory, mass storage, and a degree of data processing capability at least sufficient to manage a network connection. It is also noted that clients 140a-d may also be configured to directly access the storage network 100 and therefore may also be considered as hosts (or initiating devices).

Figure 2:
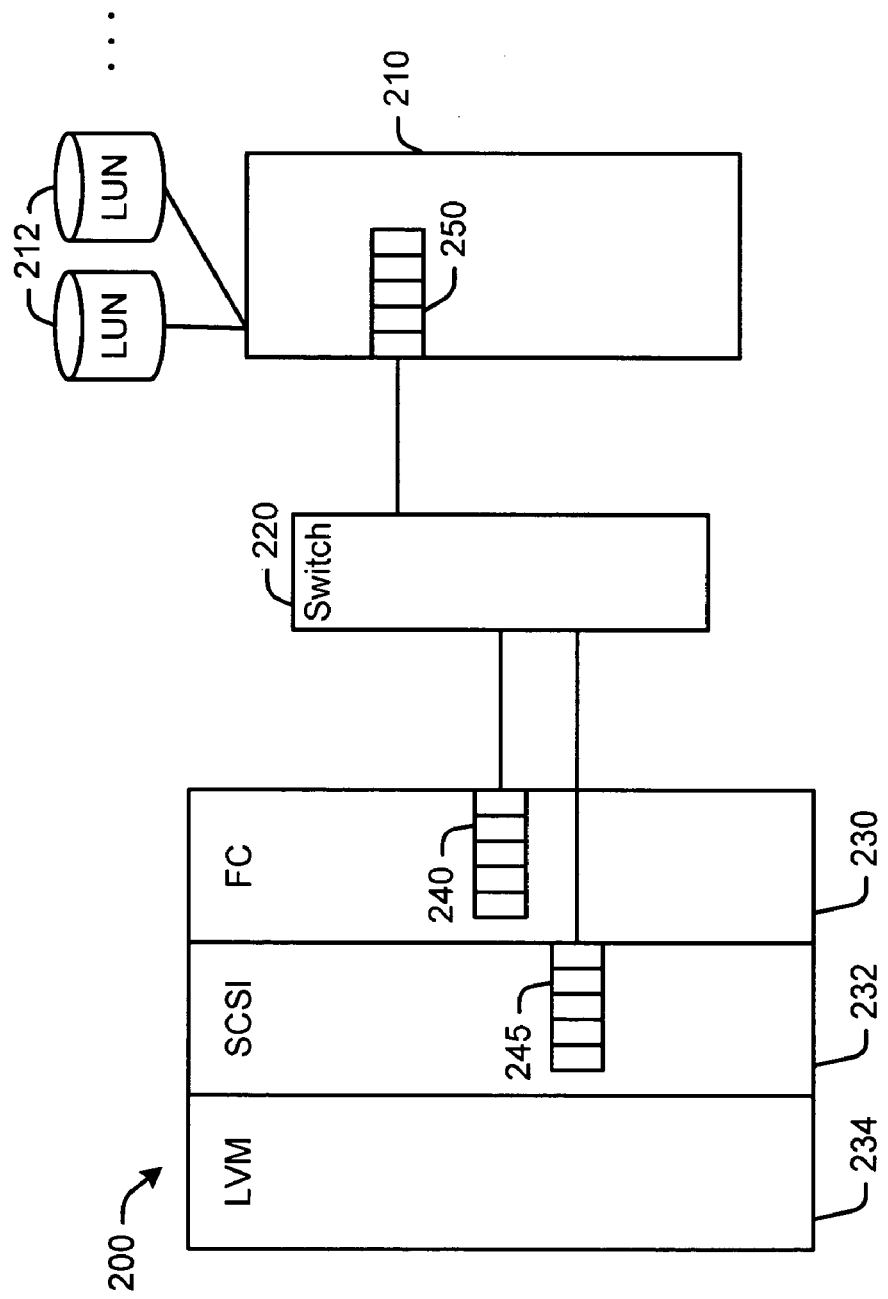
FIG. 2 is a schematic illustration of an exemplary implementation of a host connected to a storage device in a storage network.

FIG. 2 is a schematic illustration of a host as it may be connected to a storage device in a storage network (such as the storage network 100 in FIG. 1). Exemplary host 200 may be connected to storage device 210 (or target), e.g., via a switch 220 (or bridges, routers, hubs, etc.). Storage device 210 is illustrated in FIG. 2 including a number of logical units or LUNs 212. Host 200 may logically couple directly to a plurality of LUNs 212, and/or a plurality of hosts may share LUNs 212, as described in more detail above.

Exemplary host 200 is also shown in FIG. 2 including storage management drivers in the kernel, such as, e.g., a FC layer 230, a SCSI layer 232, among others (a logical volume manager 234 is shown for purposes of illustration). The storage management drivers facilitate data transfer (e.g., IO jobs) between the host 200 and the storage device 210.

In an exemplary implementation, IO jobs may be managed using queues. A queue may be implemented as a data structure, e.g., in the device driver logic. For example, host 200 may issue IO jobs for the storage device 210 from a host queue, such as, e.g., host queue 240 in the FC layer 230 or host queue 245 per LUN in the SCSI layer 232. IO jobs received at the storage device 210 may be placed into a service queue 250 for processing.

Device loading may be implemented in a storage network (e.g., the storage network 100 in FIG. 1) so that the number of IO jobs being issued by the host 210 do not exceed the queue depth of the service queue 250. In an exemplary implementation, device loading may be determined using the following algorithm in which the actual loading should not exceed the maximum queue depth for the storage device for optimum performance:

$$\text{Service-}Q \geq P*q*L$$

Where:
Service-Q: maximum queue depth for each target port;
P: number of host paths connected to the target port;
q: queue depth for each LUN on the host port; and
L: number of LUNs configured on a target port.

The following example illustrates application of the above algorithm. A storage network may be configured with a HPUX K-class host (q=8, as published) having two FC cards connected via a switch to a VA7100/7400 storage device with ten LUNs (L=10) assigned to the VA7100/7400 storage device. Accordingly, there are two paths connected to one port at the VA7100/7400 storage device (i.e., P=2). The VA7100/7400 storage device has a published maximum service queue depth of 750. Therefore, the device loading may be determined as follows:

$$\text{Actual Loading} = (1*2*8*10) = 160$$

Based on these results, the VA7100/7400 storage device may experience a maximum actual IO loading of 160, or 21.33% of the maximum service queue depth of 750 for a VA7100/7400 storage device. Therefore, a storage network configured with the HPUX host and VA7100/7400 storage device, as described above, should function properly. In addition, this storage network may be designed with a device loading that is even higher, so long as the maximum actual IO loading is less than the acceptable device loading (e.g., 750). If a higher device loading is desired, the VA7100/7400 storage device may not be able to handle IO jobs and may crash or cause other side-effects such as, e.g., performance degradation on hosts and/or other devices in the storage network. In such an event, the storage network may be modified by increasing the number of host ports connected to the storage device port or by increasing the number of LUNs assigned to the storage device port.

In an exemplary implementation, a loading factor may be applied so that the actual loading is always less than the maximum service queue depth. For example, a loading factor of about 80-90% (e.g., maximum for user environments) or about 85-90% (e.g., minimum recommended for test environments) of the maximum service queue depth may be applied to one or more of the storage devices. Of course any suitable loading factor may be applied based on various design considerations, such as, e.g., types of storage devices, types of hosts, expected IO traffic, and size of the storage network, to name only a few examples.

Alternatively, device loading may be determined using the following algorithm (e.g., if q and/or L are not published or otherwise unknown):

$$\text{Service-}Q \geq P*Q$$

Where:
Q: queue depth for each host port.

These algorithms may also be applied in a heterogeneous storage network having a plurality of hosts connected to a storage device as follows:

$$\text{Service-}Q \geq \sum_{n=1}^{i} \text{Host}_n(P*q*L) \text{ or}$$

$$\text{Service-}Q \geq \sum_{n=1}^{i} \text{Host}_n(P*Q)$$

Where:

Host$_n$: each of the different host ports.

Figure 3:
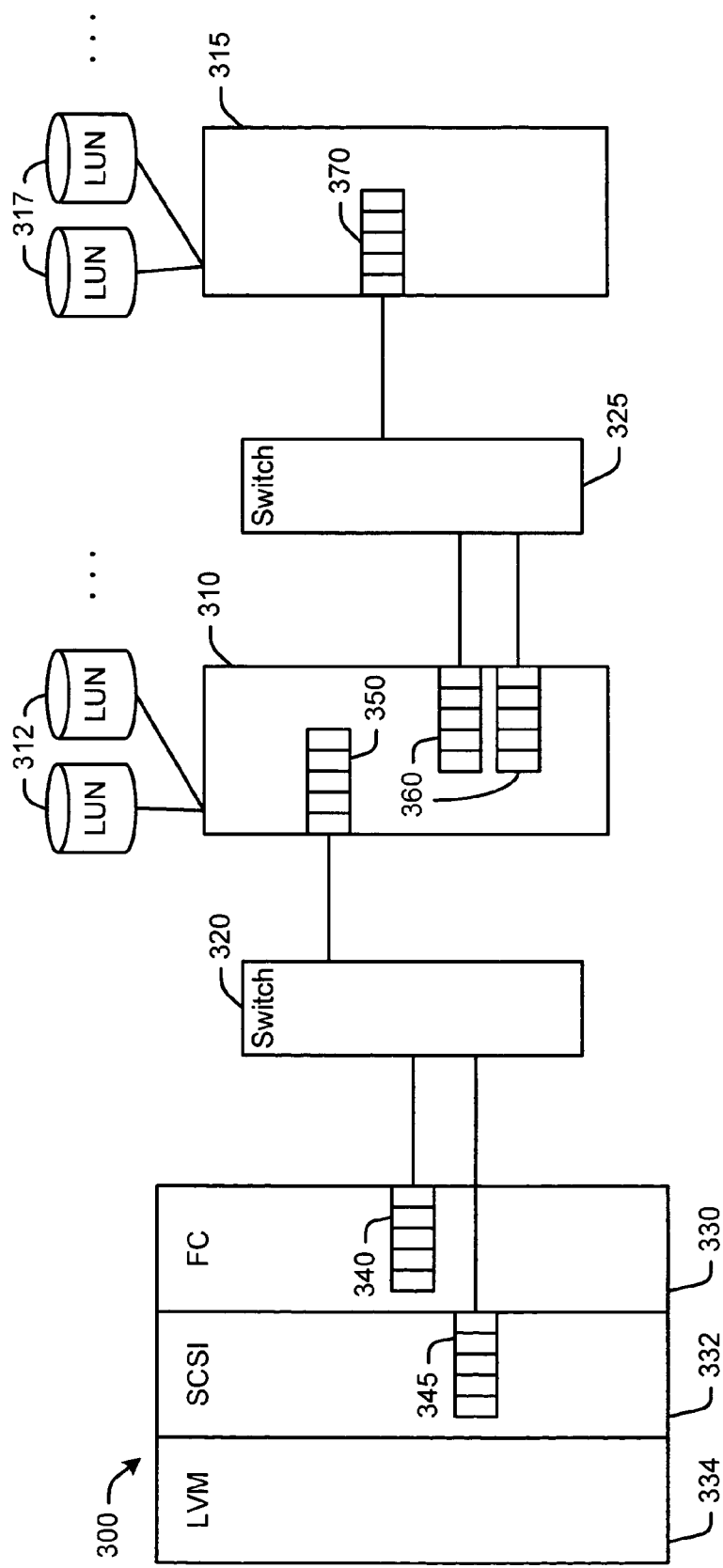
FIG. 3 is another schematic illustration of an exemplary implementation of a host connected to a backend storage device through a front-end storage device in a storage network.

FIG. 3 is another schematic illustration of a host connected to a backend storage device through a front-end storage device in a storage network (e.g., in storage network 100 of FIG. 1). Exemplary host 300 may be connected to a front-end storage device 310, e.g., via switch 320. Front-end storage device 310 may in turn be connected to a backend storage device 315, e.g., via switch 325.

As described above for FIG. 2, exemplary host 300 may also include storage management drivers 330, 332, 334 to facilitate data transfer (e.g., IO jobs) between the host 300 and the storage devices 310, 315. In addition, storage devices 310, 315 are illustrated in FIG. 3 each including a number of logical units or LUNs 312, 317, respectively, such as described above for FIG. 2.

According to the exemplary implementation of FIG. 3, either the front-end storage device 310 and/or backend storage device 315 may be considered the target device, and depends if the host 300 is issuing IO jobs to the front-end storage device 310 and/or to the backend storage device 315. If the front-end storage device 315 is also issuing IO jobs to backend storage device 315, the front-end storage device is referred to herein as an initiating device (or initiator).

IO jobs may be managed using queues. For example, host 300 may issue IO jobs for the target from a host queue, such as, e.g., host queue 340 in the FC layer 330 or host queue 345 in the SCSI layer 332. IO jobs received at the front-end storage device 310 may be placed into a service queue 350.

In addition, front-end storage device 310 may issue IO jobs to one or more backend storage devices 315. According to this implementation, front-end storage device 310 serves as an initiator. IO jobs are placed in initiator queue(s) 360 and may be received at the backend storage device 315 (or target) and placed into a service queue 370 for processing.

Again, device loading may be implemented in a storage network (e.g., the storage network 100 in FIG. 1) so that the number of IO jobs being issued by the initiating device (e.g., host 300 and/or front-end storage device 310) do not exceed the queue depth for the service queue of the target (e.g., front-end storage device 310 or backend storage device 315). Device loading for the front-end storage device may be determined using the following algorithm in which the actual loading should not exceed the maximum queue depth for the front-end storage device:

$$\text{Service-}Q_F \geq P*q*(L_F+L_B)$$

Where:

Service-$Q_F$: maximum queue depth for front-end target port;

P: number of host paths connected to the target port;

q: queue depth for each LUN on the host port;

$L_F$: number of LUNs configured on front-end target port; and $L_B$: number of LUNs configured on backend target port.

or $$\text{Service-}Q_F \geq P*Q$$

and

Total LUNs=LUNs$_F$+LUNs$_B$

Where:

Q: queue depth for each host port

LUNS$_F$: LUNs configured on front-end storage device

LUNS$_B$: LUNs configured on backend storage device

In addition, device loading may be determined for the backend storage device using the following algorithm in which the actual loading should not exceed the maximum queue depth for the backend storage device:

$$\text{Service-}Q_B \geq P*q_t*L_B$$

Where:

Service-$Q_B$: maximum queue depth for front-end target port;

P: number of host paths connected to the target port;

$q_t$: queue depth for each LUN on the host port;

$L_B$: number of LUNs configured on backend target port.

or $$\text{Service-}Q_B \geq P*Q_t$$

and

Total LUNs=LUNs$_F$+LUNs$_B$

Where:

$Q_t$: queue depth for each host port

LUNS$_F$: LUNs configured on front-end storage device

LUNS$_B$: LUNs configured on backend storage device

For purposes of illustration, a front-end storage device (e.g., FC-SCSI multiplexer without any LUNs of its own) may be connected to a backend storage device (e.g., a SCSI array). The front-end storage device includes two FC front-end port and four backend SCSI ports. If the front-end FC port has a service queue of 480, the backend storage device has a service queue of 240, the initiator port queue depth per LUN on the front-end storage device is 8 per LUN, the number of LUNs that may be defined on the backend storage device at 90% may be determined as follows: 8*1*L≦240*90/100. Accordingly, L should be less than or equal to 27. It is noted that the front-end storage device includes only one path in this example (i.e., p=1).

Next, the loading on the front-end storage device may be determined. At 90% loading, the maximum LUNs the front-end storage device may be configured with is two (p=2) HPUX hosts connected in the front-end at a queue depth per LUN of 8 may be determined as follows: 8*2*L≦480*90/100. Accordingly, L should be less than or equal to 27. That is, only the LUNs from the back-end storage device may be configured on the front-end storage device.

However, if only one HPUX host is connected to the front-end storage device, p=1 and L≦54. Accordingly, two front-end storage devices (having 27 LUNs each) may be connected to two backend storage devices.

It is noted that the exemplary implementations shown and described in FIG. 2 and FIG. 3 are illustrative and other implementations are also contemplated. For example, one or more hosts may be connected to one or more storage devices. Likewise, one or more front-end storage devices may be connected to one or more backend storage devices, and one or more backend storage devices may be connected to one or more other backend storage devices.

Figure 4:
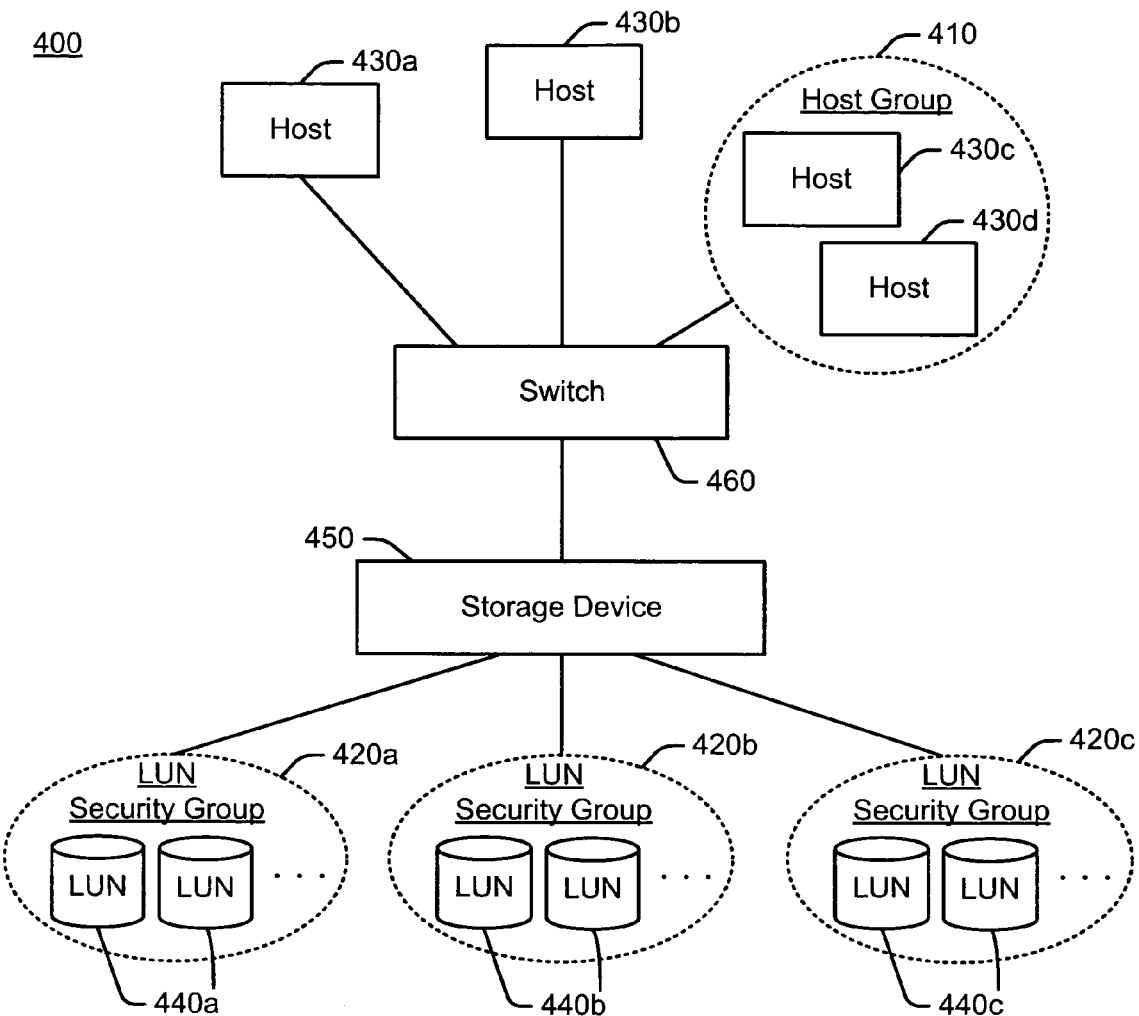
FIG. 4 is a schematic illustration of an exemplary implementation of host groups and LUN security groups in a storage network.

FIG. 4 is a schematic illustration of host groups and LUN security groups in a storage network. In an exemplary implementation, a storage network 400 may include one or more host groups 410 connected, e.g., via switch 460 to one or more LUN security groups 420a-c configured on storage device 450.

Generally, host groups are logical groupings of hosts having the same operating system. By grouping hosts with the same operating system, a storage device is better able to provide specific functionality for a plurality of different types of operating systems which may be accessing the storage device simultaneously. For purposes of illustration, hosts 430a-d may be configured to access storage device 450 in FIG. 4. Hosts 430c-d may be running the same operating system and therefore can be logically grouped into a host group 410. The storage device may respond to any host that is a member of host group 410 in the same manner because each member host has the same operating system and therefore will respond the same.

Host group 410 may be configured to access, e.g., LUN security group 420c at the storage device 450. LUN security groups 420a-c may include logical groupings of LUNs 440a-c. Generally, a LUN security group includes a set of LUNs which are configured for a particular host or host group. LUN security groups may be implemented to separate access to areas of the storage device 450, e.g., for security purposes. Only the designated hosts (or host groups) are allowed to access a LUN security group. Other hosts (or host groups) cannot access the LUNs in a LUN security group belonging to another host (or host group). For purposes of example, LUN security group 420c may be configured so that only hosts 430c-d (i.e., group 410) are permitted access to LUNs 440c, and hosts 430a, 430b are not permitted access to LUNs 440c. Instead, host 430a may be permitted exclusive access to LUN security group 420a and host 430b may be permitted exclusive access to LUN security group 420b.

Before continuing, it is noted that although host groups and LUN security groups may both be implemented in a storage network, host groups do not need to be used with LUN security groups, and vice versa.

Device loading may also be implemented in a storage network (e.g., the storage network 100 in FIG. 1) for host groups and/or LUN security groups. Generally, the storage device may be treated as a combination of virtual single port connections to the host ports. The loading on each virtual single port connection may be determined using the algorithms described above, and then summed for each host. In other words:

$$\text{Service-}Q \geq \sum_{n=1}^{i} [q(\text{Host}_n) * L(\text{Host}_n)]$$

Where:
Service-Q: maximum queue depth for front-end target port;
q: queue depth for each LUN on each host port n; and
L: number of LUNs configured for each host port n on a target port.

For purposes of illustration, a storage network (such as storage network 400 in FIG. 4) may include an XP512 storage device configured with a LUN security group. Three hosts (Host1, Host2, and Host3) may be configured to access the LUN security group. Device loading for each host may be determined using L*q, as follows:
Device loading for Host1 is 11*8=88;
Device loading for Host2 is 8*32=256; and
Device loading for Host3 is 7*2=14.

The overall loading for the XP512 storage device is thus the sum of the device loading for each of the hosts (i.e., 358), which is less than the published service queue depth of 1024 for an XP512 storage device. Therefore, the storage network should function properly.

As another illustration, a storage network (such as storage network 400 in FIG. 4) may include an XP512 storage device configured with a LUN security group. Four hosts (Host1, Host2, Host3, and Host4) may be configured to access the LUN security group. Host3 and Host4 may be configured as a heterogeneous host group (e.g., XP1024/XP128) so that both hosts have access to the same number of LUNs. Device loading for each of the hosts in the host group may be determined using L*q, as follows:
Device loading for Host3 is 7*2=14; and
Device loading for Host4 is 7*12=84.

Device loading due to the host group is the sum of the device loading for Host3 and Host 4 (i.e., 98). The overall loading for the XP512 storage device is thus the sum of the device loading for each of the hosts and host groups (i.e., 596), which is less than the published service queue depth of 1024 for an XP512 storage device. Therefore, the storage network should function properly.

As yet another illustration, a storage network (such as storage network 400 in FIG. 4) may include an XP512 storage device configured with a LUN security group. Host groups (WWN1-WWN6) may be configured to access three LUN security groups. A first host group includes host WWN1 and is configured to access 50 LUNs; a second host group includes hosts WWN2-WWN4; and a third host group includes hosts WWN5-WWN6.

Device loading for the first host group is the device loading for host WWN1 (i.e., 50*1*8=400); device loading for the second host group is the device loading for hosts WWN2-WWN4 (i.e., 20*5*8=800); and device loading for the third host group is the device loading for hosts WWN5-WWN6 (i.e., 30*2*8=480). The overall loading for the XP512 storage device is thus the sum of the device loading for each of the host groups (i.e., 400+800+480=1680) which exceeds the published service queue depth of 1024 for an XP512 storage device. Therefore, the storage network may not function properly, and device loading should be reduced, e.g., by reducing the number of LUNs in the second and third host groups.

It is noted that the exemplary implementations discussed above are provided for purposes of illustration. Still other implementations are also contemplated.

Exemplary Operations

Figure 5:
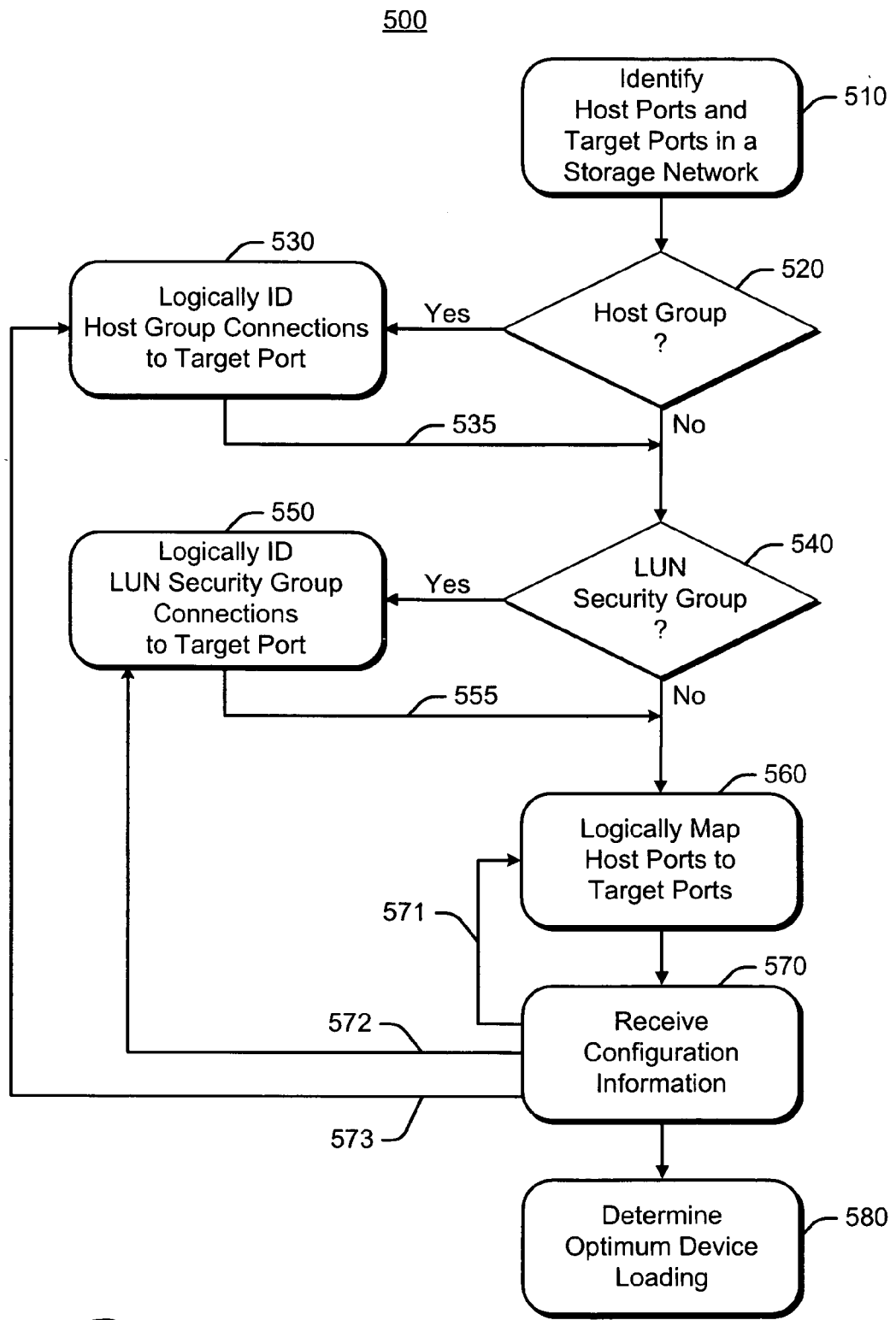
FIG. 5 is a flowchart illustrating exemplary operations to implement device loading in storage networks.
Figure 6:
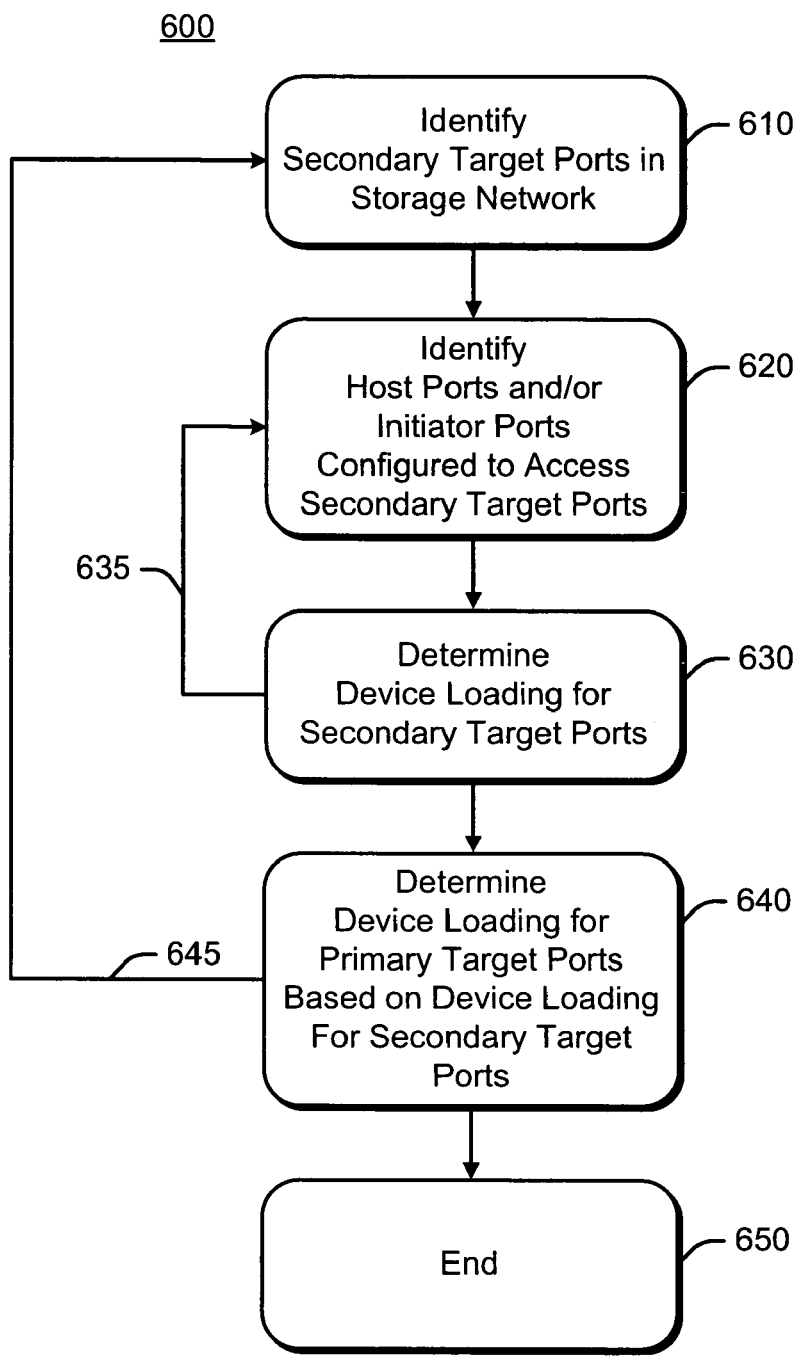
FIG. 6 is another flowchart illustrating exemplary operations to implement device loading in storage networks.

FIGS. 5 and 6 are flowcharts illustrating exemplary operations to implement device loading in storage networks. Operations 500 in FIG. 5 and operations 600 in FIG. 6 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used to implement device loading in storage networks.

FIG. 5 illustrates an exemplary implementation of device loading in storage networks optionally including host groups and/or LUN security groups (e.g., as described with reference to FIG. 4). In operation 510 host ports and target ports are identified in a storage network. In operation 520, a determination is made if there are any host groups. If the storage network includes host groups, host group connections to the target port may be logically identified in operation 530 and continues via arrow 535 to operation 540. If the storage network does not include host groups, the method continues directly to operation 540.

In operation 540, a determination is made whether there are any LUN security groups. If the storage network includes LUN security groups, the LUN security group connections to the target port are logically identified in operation 550 and the method continues via arrow 555 to operation 560. If the storage network does not include LUN security groups, the method continues directly to operation 560.

In operation 560 host ports are logically mapped to target ports. Configuration information is received in operation 570 and the storage network is configured for optimum device loading in operation 580.

The method shown and described with reference to FIG. 5 may be implemented as iterative operations. Arrow 571 illustrates iterating operations 560 and 570, e.g., if the storage network includes a plurality of host ports and/or target ports. Arrow 572 illustrates iterating operations 550-570, e.g., if the storage network includes a plurality of LUN security groups. Arrow 573 illustrates iterating operations 530-570, e.g., if the storage network includes a plurality of host groups.

FIG. 6 illustrates an exemplary implementation of device loading in storage networks optionally including backend target ports (e.g., as shown in FIG. 3). In operation 610, backend ports are identified in the storage network. Host ports and/or initiator ports configured to access the backend ports identified in operation 610 are identified in operation 620. In operation 630, the device loading for the backend ports is determined. For example, device loading may be determined using the exemplary algorithms described above.

Operations 620 and 630 may be iterative, as illustrated by arrow 635, e.g., if the storage network includes a plurality of host ports and/or initiator ports configured to access the backend ports.

In operation 640 the device loading for front-end ports may be determined based on device loading for the backend ports (e.g., determined in operation 630). The method may return via arrow 645 to operation 610 if the storage network includes a plurality of backend ports. If all of the backend ports have been configured for the storage network, the method may end at operation 650.

The operations shown and described herein are merely illustrative of exemplary implementations of device loading in storage networks. It is also noted that the operations are not limited to any particular order. In FIG. 5 for example, operations 520-530 may be omitted if the storage network is not expected to include host groups, and/or operations 540-550 may be omitted if the storage network is not expected to include LUN security groups. Still other operations may also be implemented to enable device loading in storage networks.
Exemplary Computing Device FIG. 7 is a schematic illustration of an exemplary computing device 730 that can be utilized to implement the operations described herein for device loading in storage networks. Computing device 730 includes one or more processors or processing units 732, a system memory 734, and a bus 736 that couples various system components including the system memory 734 to processors 732. The bus 736 represents one or more of any of several types of bus structures, including a memory bus or memory controller, a peripheral bus, an accelerated graphics port, and a processor or local bus using any of a variety of bus architectures. The system memory 734 includes read only memory (ROM) 738 and random access memory (RAM) 740. A basic input/output system (BIOS) 742, containing the basic routines that help to transfer information between elements within computing device 730, such as during start-up, is stored in ROM 738.

Computing device 730 further includes a hard disk drive 744 for reading from and writing to a hard disk (not shown), and may include a magnetic disk drive 746 for reading from and writing to a removable magnetic disk 748, and an optical disk drive 750 for reading from or writing to a removable optical disk 752 such as a CD ROM or other optical media. The hard disk drive 744, magnetic disk drive 746, and optical disk drive 750 are connected to the bus 736 by a SCSI interface 754 or some other appropriate interface. The drives and their associated computer-readable media provide nonvolatile storage of computer-readable instructions, data structures, program modules and other data for computing device 730. Although the exemplary environment described herein employs a hard disk, a removable magnetic disk 748 and a removable optical disk 752, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 744, magnetic disk 748, optical disk 752, ROM 738, or RAM 740, including an operating system 758, one or more application programs 760, other program modules 762, and program data 764. A user may enter commands and information into computing device 730 through input devices such as a keyboard 766 and a pointing device 768. Other input devices (not shown) may include a microphone, joystick, game pad, satellite dish, scanner, or the like. These and other input devices are connected to the processing unit 732 through an interface 770 coupled to the bus 736. A monitor 772 or other type of display device is also connected to the bus 736 via an interface, such as a video adapter 774.

Computing device 730 may operate in a networked environment using logical connections to one or more remote computers, such as a remote computer 776. The remote computer 776 may be a personal computer, a server, a router, a network PC, a peer device or other common network node, and typically includes many or all of the elements described above relative to computing device 730, although only a memory storage device 778 has been illustrated in FIG. 7. The logical connections depicted in FIG. 7 include a LAN 780 and a WAN 782.

When used in a LAN networking environment, computing device 730 is connected to the local network 780 through a network interface or adapter 784. When used in a WAN networking environment, computing device 730 typically includes a modem 786 or other means for establishing communications over the wide area network 782, such as the Internet. The modem 786, which may be internal or external, is connected to the bus 736 via a serial port interface 756. In a networked environment, program modules depicted relative to the computing device 730, or portions thereof, may be stored in the remote memory storage device. It will be appreciated that the network connections shown are exemplary and other means of establishing a communications link between the computers may be used.

Generally, the data processors of computing device 730 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

The invention claimed is:

1. A computer program product including computer-readable storage with a computer program, the computer program executing a computer process on a computer system, the computer process:
    identifying a plurality of storage devices to be configured in a storage network;
    identifying a number of host port Logical Unit Numbers (LUNs) which are configured on each of the storage devices;
    identifying a number of host port connections to the storage devices;
    determining actual loading for each of the storage devices based at least in part on a number of LUN security groups in the storage network; and
    for each host port connection, determining actual loading of input/output (IO) jobs for each of the storage devices based at least in part on a queue depth for each of the host port LUNs.

2. The computer program product of claim 1 wherein the computer process further comprises determining actual loading for each of the storage devices based at least in part on a number of host groups in the storage network.

3. The computer program product of claim 1 wherein the computer process further uses a loading factor to determine if the actual loading for each of the storage devices exceeds a maximum loading.

4. The computer program product of claim 1 wherein the computer process further simplifies host groups and LUN security groups into virtual connections for analysis.

5. A computer program product including computer-readable storage with a computer program, the computer program executing a computer process on a computer system, the computer process:
    identifying a plurality of storage devices to be configured in a storage network;
    identifying a number of host port Logical Unit Numbers (LUNs) which are configured on each of the storage devices;
    identifying a number of host port connections to the storage devices;
    for each host port connection, determining actual loading for each of the storage devices based at least in part on a queue depth for each of the host port connection; and
    wherein the computer process further simplifies host group and LUN security groups into virtual connections for analysis.

6. The computer program product of claim 5 wherein the computer process further comprises determining actual loading for each of the storage devices based at least in part on a number of host groups in the storage network.

7. The computer program product of claim 5 wherein the computer process further comprises determining actual loading, for each of the storage devices based at least in part on a number of Logical Unit Numbers (LUNs) LUN security groups in the storage network.

8. The computer program product of claim 5 wherein the computer process further uses a loading factor to determine if the actual loading for each of the storage devices exceeds a maximum loading.

9. A method providing an input/output (IO) flow control mechanism in a storage network, comprising:
    configuring a storage device in the storage network with a plurality of host port Logical Unit Numbers (LUNs);
    identifying a queue depth for each of the host port LUNs;
    automatically determining actual loading for the storage device based at least in pan on a queue depth for each host port LUN;
    accepting the storage device configuration if the actual loading for the storage device is no more than a maximum loading for the storage device; and
    wherein the maximum loading for the storage device is based on a loading factor for test environments.

10. The method of claim 9 wherein automatically determining actual loading for the storage device is also based at least in part on a number of host paths connected to the storage device.

11. The method of claim 9 wherein automatically determining actual loading for the storage device port is also based at least in part on a number of LUNs configured for the storage device.

12. The method of claim 9 wherein automatically determining actual loading, for the storage device is also based at least in part on a number of host groups in the storage network.

13. The method of claim 9 wherein automatically determining actual loading for the storage device is also based at least in part on a number of LUN security groups in the storage network.

14. The method of claim 9 further comprising automatically determining actual loading for a plurality of backend LUNs connected to the storage device.

15. The method of claim 9 further comprising iteratively determining actual loading for a plurality of storage devices in the storage network.

16. The method of claim 9 wherein the loading factor is in the range of about 80% to 90% of a service queue depth for the storage device.

17. A method of device loading in a storage network, comprising:
    configuring the storage network with a plurality of host port connections to at least one storage device; and
    for each of a plurality of host port connections to the at least one storage device, determining actual loading of the at least one storage device based at least in part on a queue depth of each host port connection so that the number of input/output (IO) jobs being issued by a host do not exceed the queue depth of a service queue; and
    wherein a maximum loading for the at least one storage device is based on a loading factor for test environments.

18. The method of claim 17 wherein determining actual loading is also based at least in part on a number of host groups in the storage network.

19. The method of claim 17 wherein determining actual loading is also based at least in part on a number of Logical Unit Numbers (LUNs) LUN security groups in the storage network.

20. The method of claim 17 further comprising determining actual loading, for a plurality of backend LUNs connected to the at least one storage device.

21. The method of claim 17 further comprising iteratively determining actual loading for a plurality of storage devices in the storage network.

22. The method of claim 17 wherein device loading is a function of maximum queue depth for each target port, number of host paths connected to the target port, queue depth for each LUN on the host port, and number of LUNs configured on the target port.

23. The method of claim 17 wherein device loading is a function of queue depth for each target port, number of host paths connected to the target port, and queue depth for each host port.

* * * * *

UNITED STATES PATENT AND TRADEMARK OFFICE
CERTIFICATE OF CORRECTION

| | | |
|---|---|---|
| PATENT NO. | : 8,375,114 B2 | Page 1 of 1 |
| APPLICATION NO. | : 10/821832 | |
| DATED | : February 12, 2013 | |
| INVENTOR(S) | : Rajiv K. Grover et al. | |

It is certified that error appears in the above-identified patent and that said Letters Patent is hereby corrected as shown below:

In the Claims

In column 11, line 42, in Claim 5, delete "connection;" and insert -- connections; --, therefor.

In column 11, line 43, in Claim 5, delete "group" and insert -- groups --, therefor.

In column 11, lines 51-52, in Claim 7, delete "loading," and insert -- loading --, therefor.

In column 11, line 64, in Claim 9, delete "pan" and insert -- part --, therefor.

In column 12, line 15, in Claim 12, delete "loading," and insert -- loading --, therefor.

In column 12, line 51, in Claim 20, delete "loading," and insert -- loading --, therefor.

In column 12, lines 56-57, in Claim 22, delete "a function of" and insert -- based at least in part on --, therefor.

In column 12, lines 61-62, in Claim 23, delete "a function of" and insert -- based at least in part on --, therefor.

Signed and Sealed this
Fourteenth Day of May, 2013

Teresa Stanek Rea
*Acting Director of the United States Patent and Trademark Office*